(12) United States Patent
Zheng et al.

(10) Patent No.: US 10,454,261 B2
(45) Date of Patent: Oct. 22, 2019

(54) WATERPROOF AND DUST PROOF SECURE POP-UP FLOOR BOX

(71) Applicants: Shaotong Zheng, Wenzhou (CN); Zhirong Ye, Wenzhou (CN)

(72) Inventors: Shaotong Zheng, Wenzhou (CN); Zhirong Ye, Wenzhou (CN)

( * ) Notice: Subject to any disclaimer, the term of this patent is extended or adjusted under 35 U.S.C. 154(b) by 628 days.

(21) Appl. No.: 15/198,869

(22) Filed: Jun. 30, 2016

(65) Prior Publication Data
US 2017/0077691 A1 Mar. 16, 2017

(30) Foreign Application Priority Data

Sep. 12, 2015 (CN) ..................... 2015 2 0721977 U

(51) Int. Cl.
*H02G 3/12* (2006.01)
*H02G 3/08* (2006.01)
*H02G 3/18* (2006.01)

(52) U.S. Cl.
CPC ............. *H02G 3/185* (2013.01); *H02G 3/088* (2013.01)

(58) Field of Classification Search
CPC ............................... H02G 3/185; H02G 3/088
USPC .................... 220/3.5, 3.7, 3.3, 3.94
See application file for complete search history.

(56) References Cited

U.S. PATENT DOCUMENTS

| | | | | |
|---|---|---|---|---|
| 5,122,069 A * | 6/1992 | Brownlie | ............. | G02B 6/4451 174/53 |
| 5,230,552 A * | 7/1993 | Schipper | ................. | A47B 21/06 108/26 |
| 6,046,405 A * | 4/2000 | Obermann | ............. | H02G 3/185 174/17 CT |
| 6,848,226 B1 * | 2/2005 | Boyd | ....................... | E04F 19/08 16/225 |
| 7,045,706 B1 * | 5/2006 | Lincoln, III | ........... | H02G 3/185 174/482 |
| 9,035,182 B2 * | 5/2015 | Scanzillo | ................. | H02G 3/14 174/67 |
| 2004/0147147 A1 * | 7/2004 | Griepentrog | ......... | H01R 13/447 439/131 |
| 2010/0147547 A1 * | 6/2010 | Drane | ..................... | H02G 3/12 174/50 |
| 2011/0177714 A1 * | 7/2011 | Byrne | .................... | H02G 3/185 439/535 |
| 2013/0078853 A1 * | 3/2013 | Dinh | ...................... | H02G 3/088 439/535 |
| 2013/0192869 A1 * | 8/2013 | Drane | .................... | H02G 3/185 174/67 |
| 2016/0141850 A1 * | 5/2016 | Zbriger | .................. | H02G 3/088 174/535 |
| 2017/0141505 A1 * | 5/2017 | Forti | .................... | H01R 25/006 |

* cited by examiner

*Primary Examiner* — J. Gregory Pickett
*Assistant Examiner* — Niki M Eloshway
(74) *Attorney, Agent, or Firm* — Ziegler IP Law Group, LLC

(57) ABSTRACT

A pop up box includes an upper cover, a stationary frame pivotally fastened to a movable frame, a plate gasket forming a waterproof and dustproof seal, the plate gasket interposed between the upper cover and the stationary frame and having an opening through which the movable frame extends when released, and a button latching device having a waterproof and dustproof seal formed by at least one O-ring seal.

11 Claims, 17 Drawing Sheets

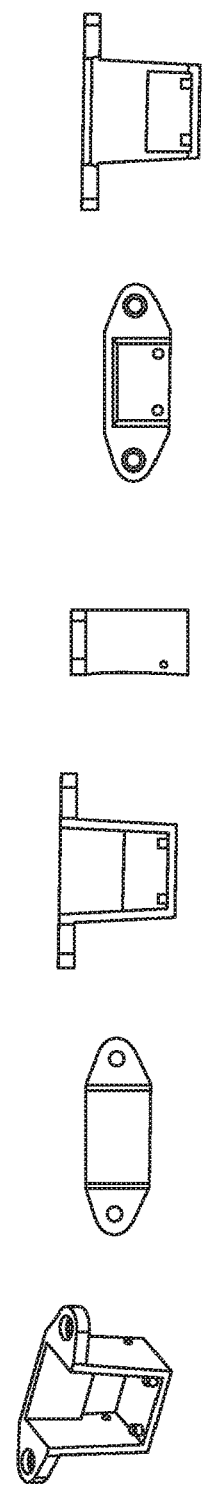

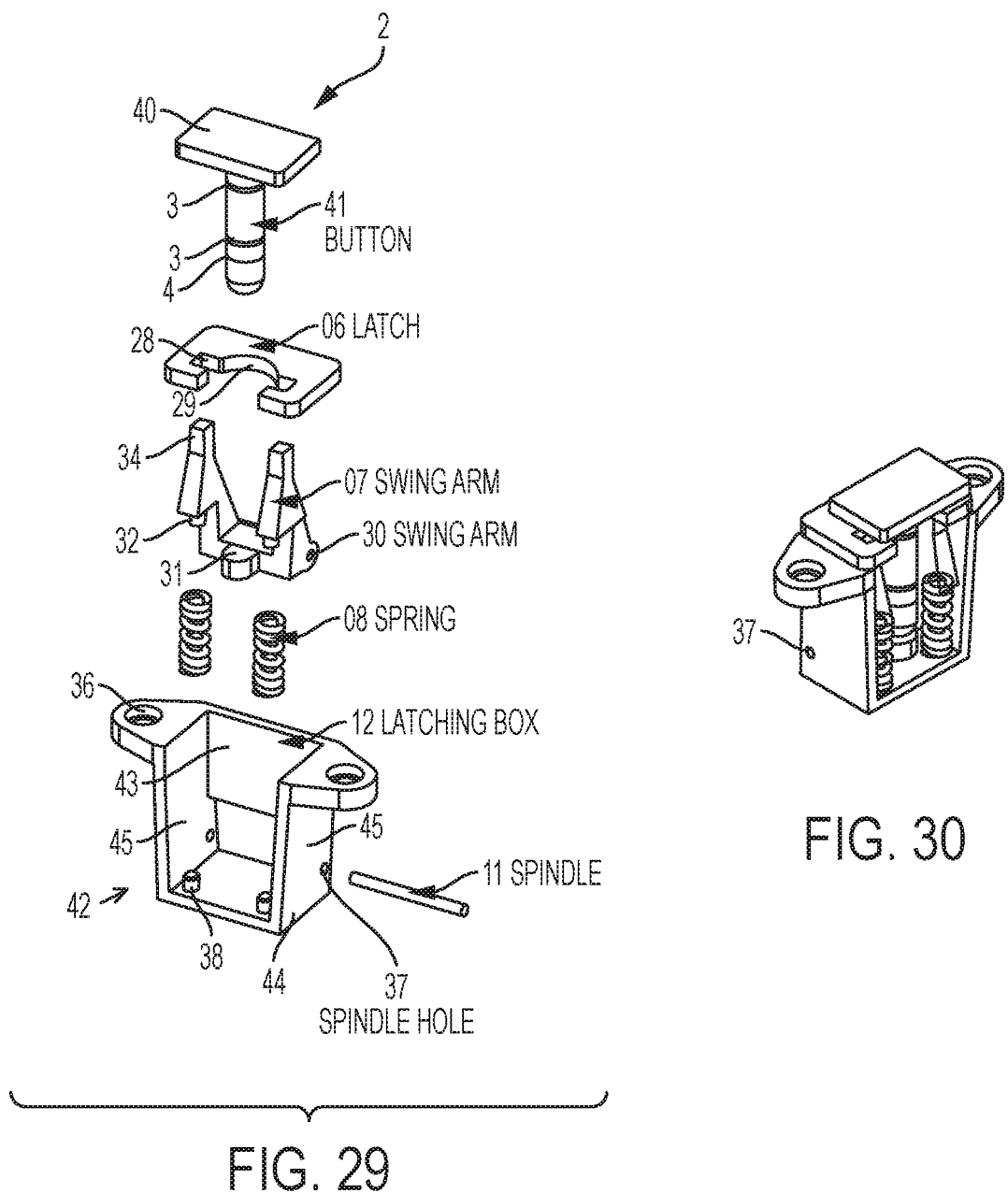

WATERPROOF AND DUST PROOF SECURE POP-UP FLOOR BOX

FIELD

The invention relates to a floor box, and especially refers to a pop-up floor box.

BACKGROUND

In the China floor box market, the pop-up floor box probably has more than 20 years of history. However, almost all pop up boxes suffer from a lack of waterproofing or dustproofing to some degree, limiting their wide spread use. The applicant previously designed a kind of dual purpose, gear type, damper pop-up floor box (CN201320321888), as shown in FIG. 31, including a plate 124, upper cover 102, movable frame 111, damping device 116, and a press cover latch 109. The upper cover 102 has a sheet 101 laminated on a surface of the upper cover 102 and the plate 124 includes an outside frame 107 and a base plate 106. A seal ring 105 is located above the base plate 106, and a plate frame 104 is located above the seal ring 105. The outside frame 107, base plate 106, seal ring 105, and plate frame 104 are fixed tightly together by one or more plate frame fasteners 108. The plate frame 104 is also laminated with a plate frame sheet 103. The movable frame 111 may house a function part 113 or parts that may be exposed for use when the movable frame 111 is extended or popped up. The function part 113 may include receptacles for accepting different connections, for example, power plugs, network plugs, coaxial connectors, or any other suitable connectors. The previously designed pop up box can be used as a floor box as well as a table box. When opening it, it opens softly and reliably with more excellent performance. When it is used as a floor box, it is almost flush with the ground and can meet an IP44 waterproof rating level. However, the previously designed pop up box also has the following defects: Firstly, in order to meet the waterproof requirement, the plate frame 104 and base plate frame 106 press on the seal ring 105 causing many lines on the surface and a degraded appearance. Secondly, the press cover latch 109 can not block the movable frame 111 when the function part 113 pops-up to prevent it from closing. This may cause security incidents when people step on the upper cover 102 by mistake and then damage the function part 113 or products that may be connected to the function part 113. Therefore, how to make the press cover latch 109 waterproof, dustproof and safe is a longstanding problem in the pop-up floor box field.

SUMMARY

After 2 years of research based on the previously designed dual purpose, gear type, waterproof, damper pop-up floor box (CN201320321888), the applicant has finally developed a brand new waterproof, dustproof, secure pop up floor box which overcomes the defects of the previously designed pop up box.

To achieve the above purpose, the solution of this invention is: a kind of waterproof and dustproof secure pop-up floor box, including a plate, upper cover, push button latch device, movable frame, stationary frame, torsional spring, and spindle. A waterproof pad is pressed on to the plate, and the bottom plate is mounted below the waterproof pad. A plate gasket includes the plate, waterproof pad and bottom plate. The push button latch device includes a latch box, a button, a latch, a swing arm, two springs, and a spindle. The button includes a shaft on which an O-ring is mounted, and the shaft is plugged into a cylinder of the plate. The button is installed with a cir-clip. The latch is positioned in a groove of the bottom plate. Upper portions of the swing arm are inserted into apertures of the latch. One end of each of the two springs is received by a base section of the swing arm and the other end contacts a bottom surface of the latch box. The swing arm is pinned inside the latch box by a spindle. The latch box is fixed below the bottom plate. A lower part of the button assembly shaft contacts a projection part of a bottom portion of the swing arm so that a vertical motion of the shaft applies a force to the projection part of the swing arm.

The waterproof and dustproof secure pop-up floor box has the following characteristics: The waterproof pad is pressed on to the plate. The bottom plate is mounted below the waterproof pad. The plate, waterproof pad, and bottom plate are integrated so the pop up box not only looks beautiful but is also waterproof and dust proof. The button uses a circular shaft type waterproof and dust proof structure and O-ring to improve the life time of the pop up box. It also makes the production easier because the parts are simplified.

The floor box is opened by pushing the button, upon which the latch will retract, and the function parts and the movable frame assembly will pop up. When the button is released after the movable frame assembly has popped up, the latch will return and extend out to block a bottom portion of the movable frame assembly in order to prevent the pop up box from closing and to prevent damage to products plugged in to the pop up box and safety accidents caused by stepping on the movable frame assembly.

The operating principle of the button latch device is as follows: When the button is pressed, the lower end of the button will be just in the middle of the swing arm bottom. The swing arm uses the spindle as the fulcrum to swing. The two springs are compressed. With the swing arm struck in the middle of the latch to drive the latch to move (retract), it means the downward movement of the button will make the latch to retract by the swing arm. If the button isn't pressed, with the effect of the two springs, the swing arm will be reset and the latch will extend. The limiting function of the circlip will prevent the button from protruding. There are two O-rings mounted on a shaft of the button. When press on the button, the o-rings always stay in the cylinder of the plate to ensure the waterproof and dust proof function. Therefore, the button latch device can not only be waterproof and dust proof but can also solve the safety problem which exists in pop-up floor box field for a long time.

In at least one embodiment, a pop up box includes an upper cover, a stationary frame pivotally fastened to a movable frame, a plate gasket forming a waterproof and dustproof seal, the plate gasket interposed between the upper cover and the stationary frame and having an opening through which the movable frame extends when released, and a button latching device having a waterproof and dustproof seal formed by at least one O-ring seal.

The movable frame may house a function part having connector receptacles.

The plate gasket may comprise a panel, a bottom plate, and waterproof pad interposed between the panel and the bottom plate.

The panel, waterproof pad, and bottom plate may have mating and interleaving patterns to effect the waterproof and dustproof seal.

The stationary frame may be fastened to the bottom plate.

The pop up box may include a latch slidingly installed in a cutout of the bottom plate.

The button latching device may include a latch box fastened to the bottom plate, a rotatably mounted, spring loaded swing arm mounted within the latch box with upper portions positioned within apertures of the latch, a button assembly including a shaft extending through a cylinder of the bottom plate and configured to contact a projection part of the swing arm, the button assembly including the at least one O-ring seal mounted between the shaft and the cylinder to form the waterproof and dustproof seal.

The latch, shaft and swing arm may be positioned such that downward movement of the shaft applies force to a projection part of the swing arm causing the swing arm to rotate and the latch to retract, releasing and allowing the movable frame assembly to pop up.

The latch, shaft and swing arm may also be positioned such that upward movement of the shaft after the movable frame assembly has popped up causes the swing arm to rotate and the latch to extend, blocking the moveable frame from closing.

BRIEF DESCRIPTION OF THE DRAWINGS

FIG. 15 is a perspective view of a latch of the button latch device;

FIG. 16 is a top view of the latch;

FIG. 17 is a perspective view of a swing arm of the push button latch device;

FIG. 18 is a right side view of the swing arm;

FIG. 19 is a front view of the swing arm;

FIG. 20 is a rear view of the swing arm;

FIG. 21 is a top view of the swing arm;

FIG. 22 is a bottom view of the swing arm;

FIG. 23 is a perspective view of latch box of the push button latch device;

FIG. 24 is a bottom view of the latch box;

FIG. 25 is a front view of the latch box;

FIG. 26 is a right side view of the latch box, where the right side view is symmetric to the left side view;

FIG. 27 is a top view of the latch box;

FIG. 28 is the rear view of the latch box;

FIG. 29 is the exploded view of the latch box;

FIG. 30 is the perspective view of the latch box; and

Figure 1:
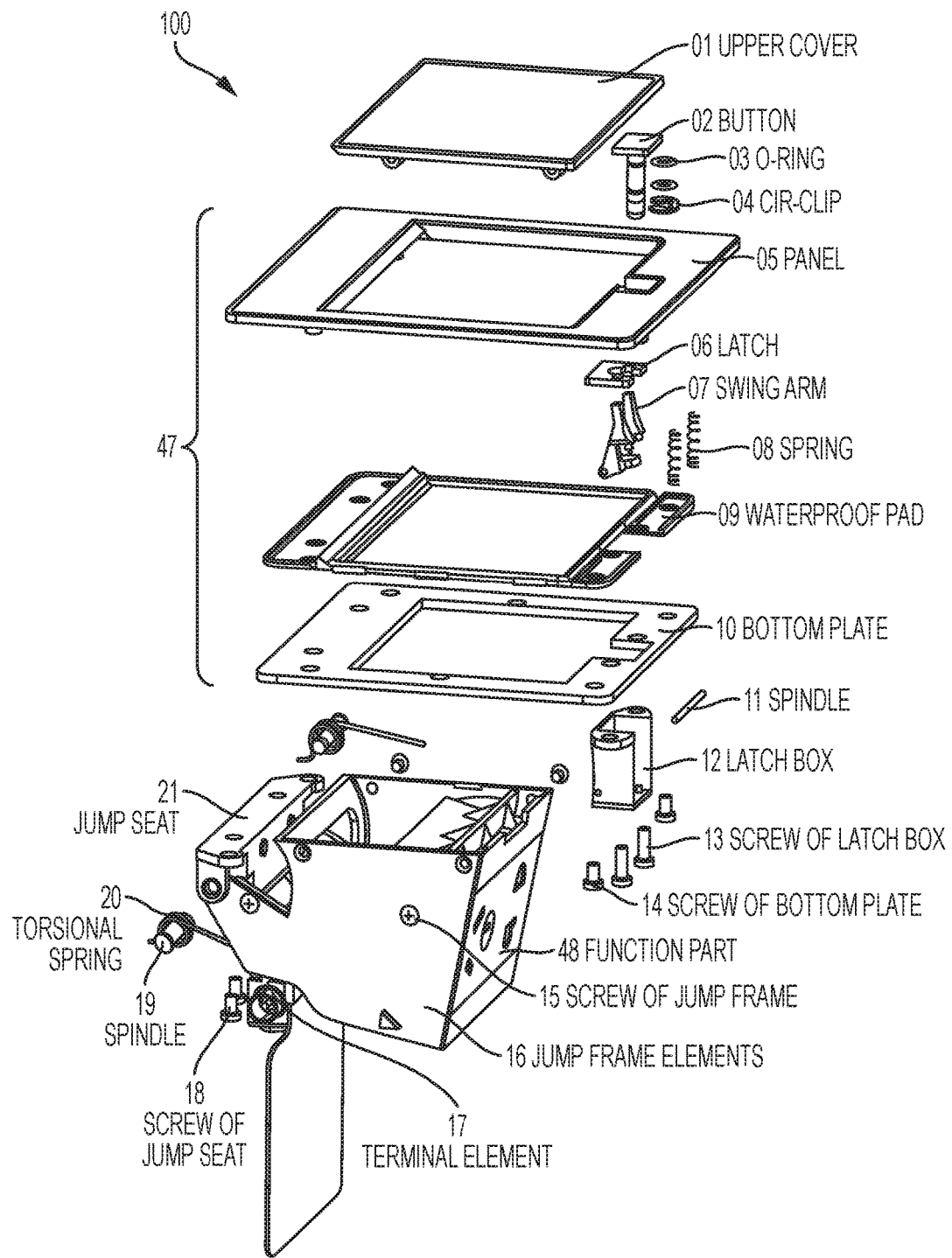
FIG. 1 is an exploded view of an exemplary implementation of the presently disclosed embodiments.
Figure 2:
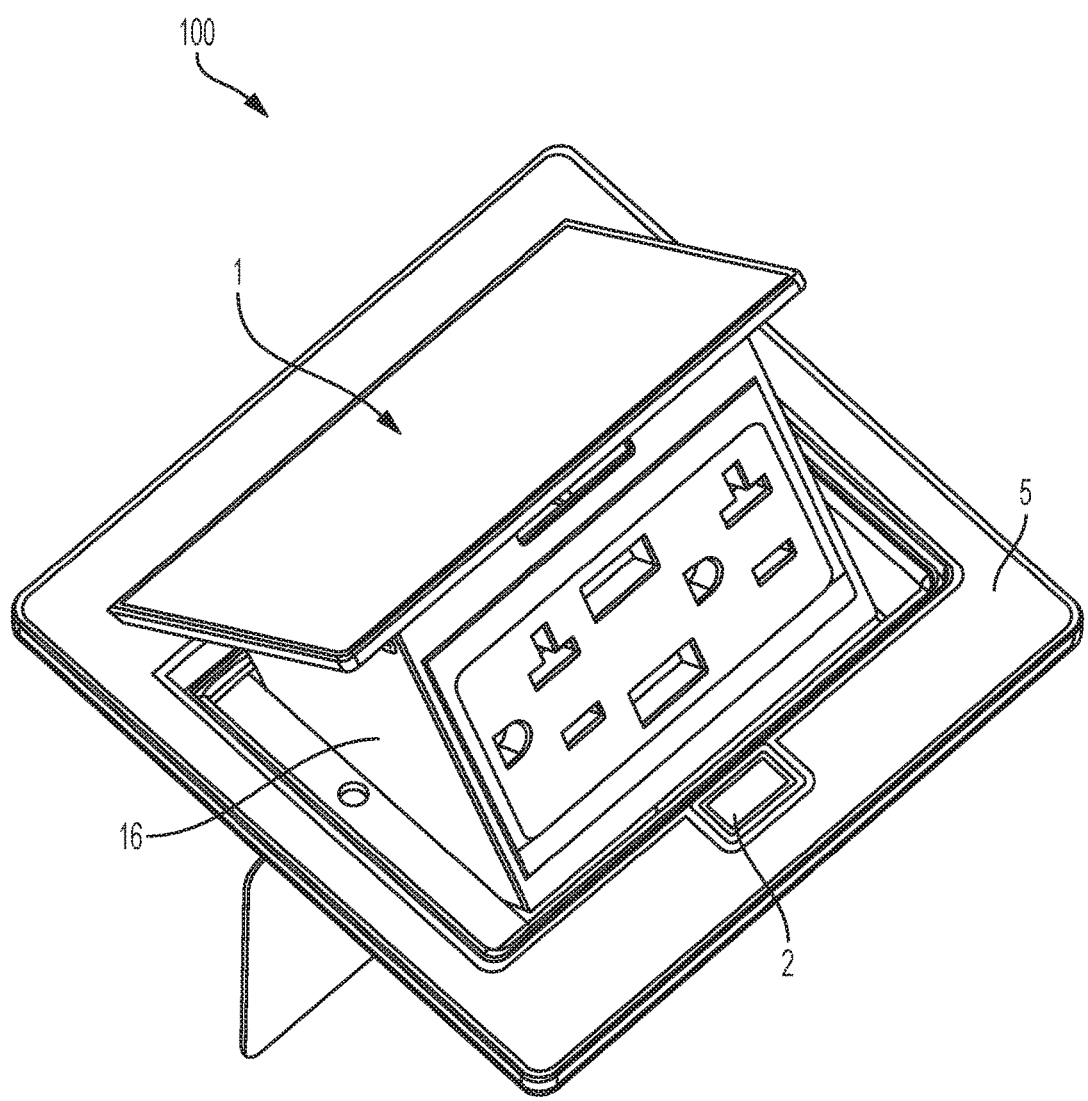
FIG. 2 is a perspective view of the implementation of the presently disclosed embodiments in a pop-up state.
Figure 3:
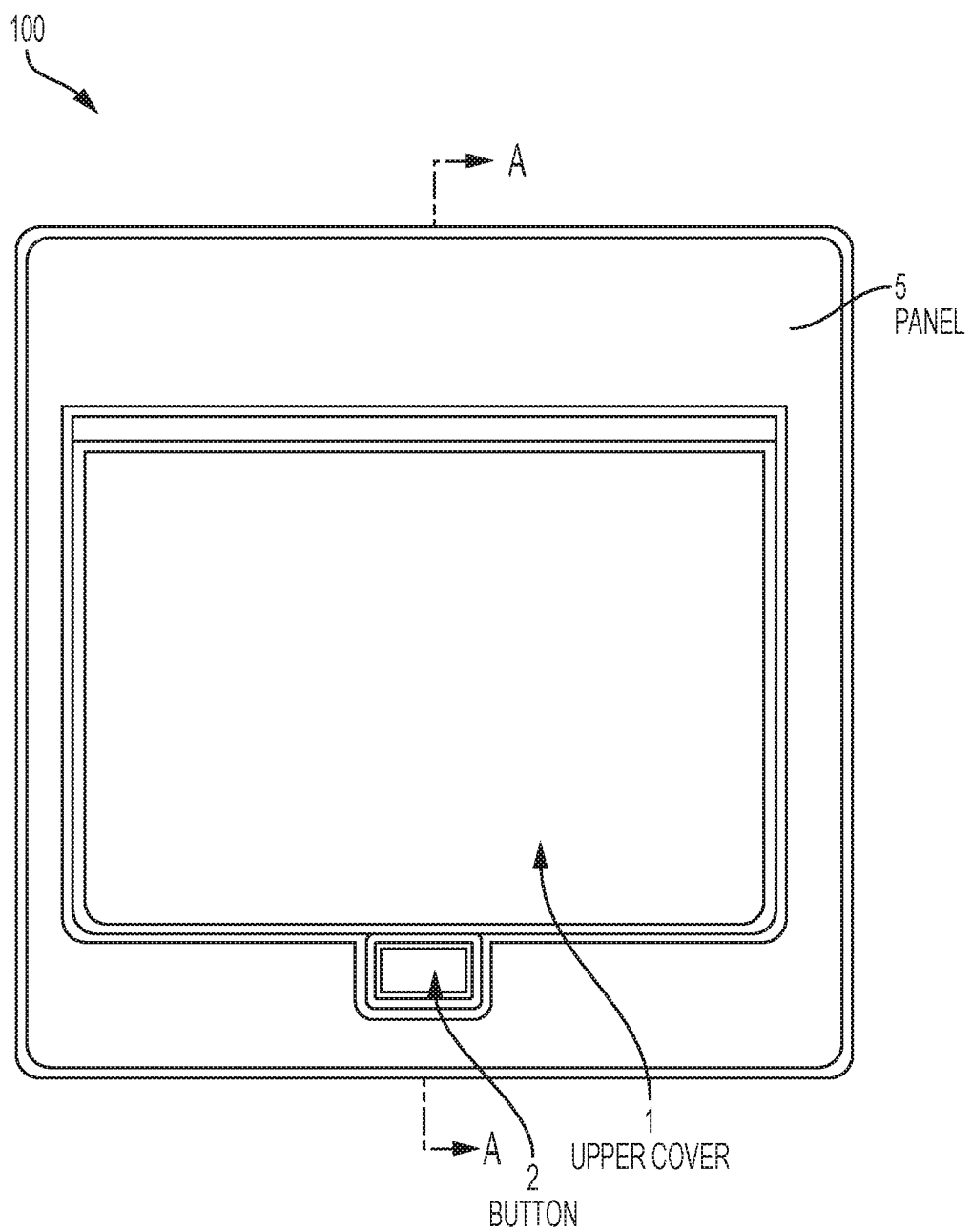
FIG. 3 is a front view of the implementation of the presently disclosed embodiments.
Figure 4:
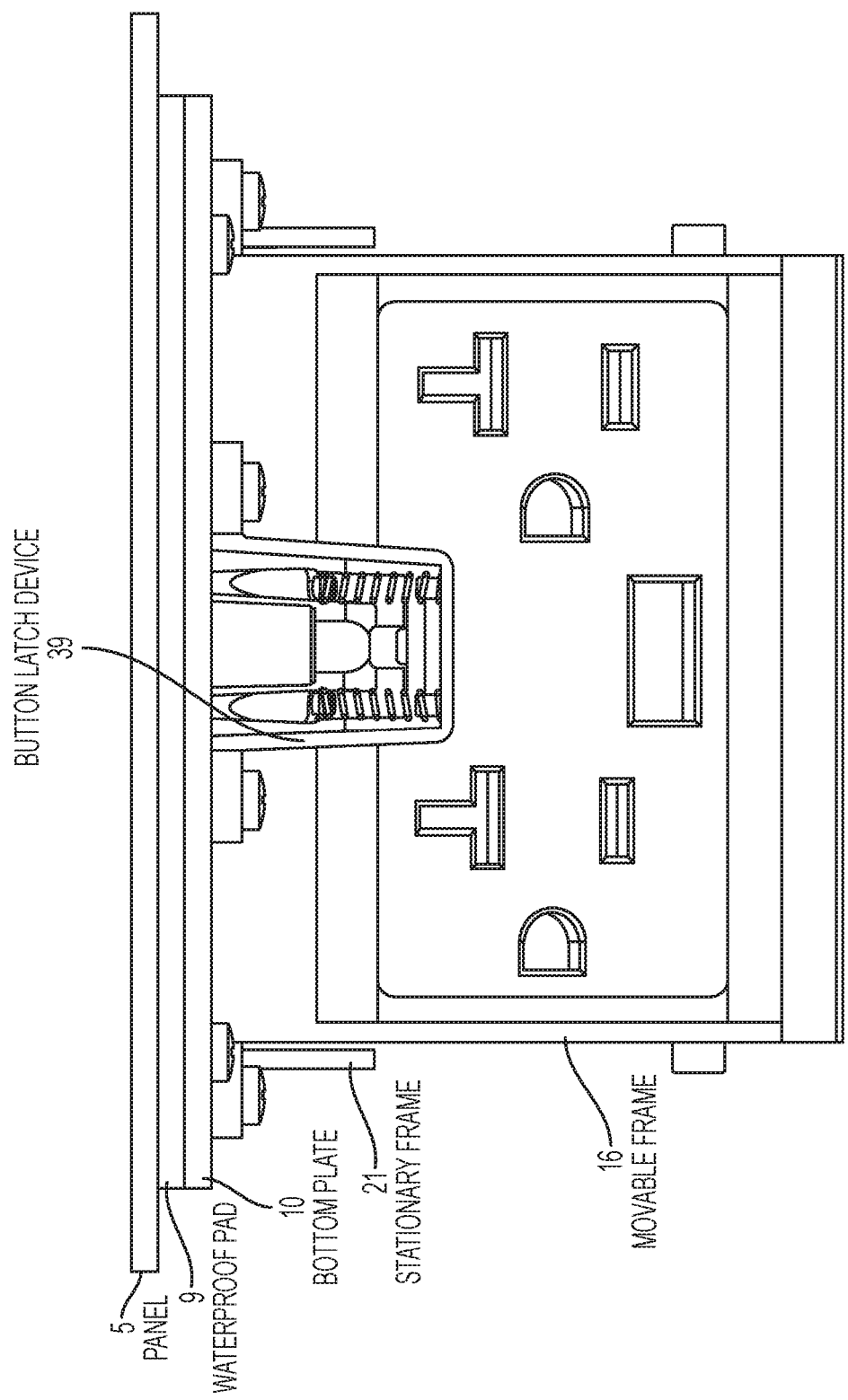
FIG. 4 is a bottom view of the implementation of the presently disclosed embodiments.
Figure 5:
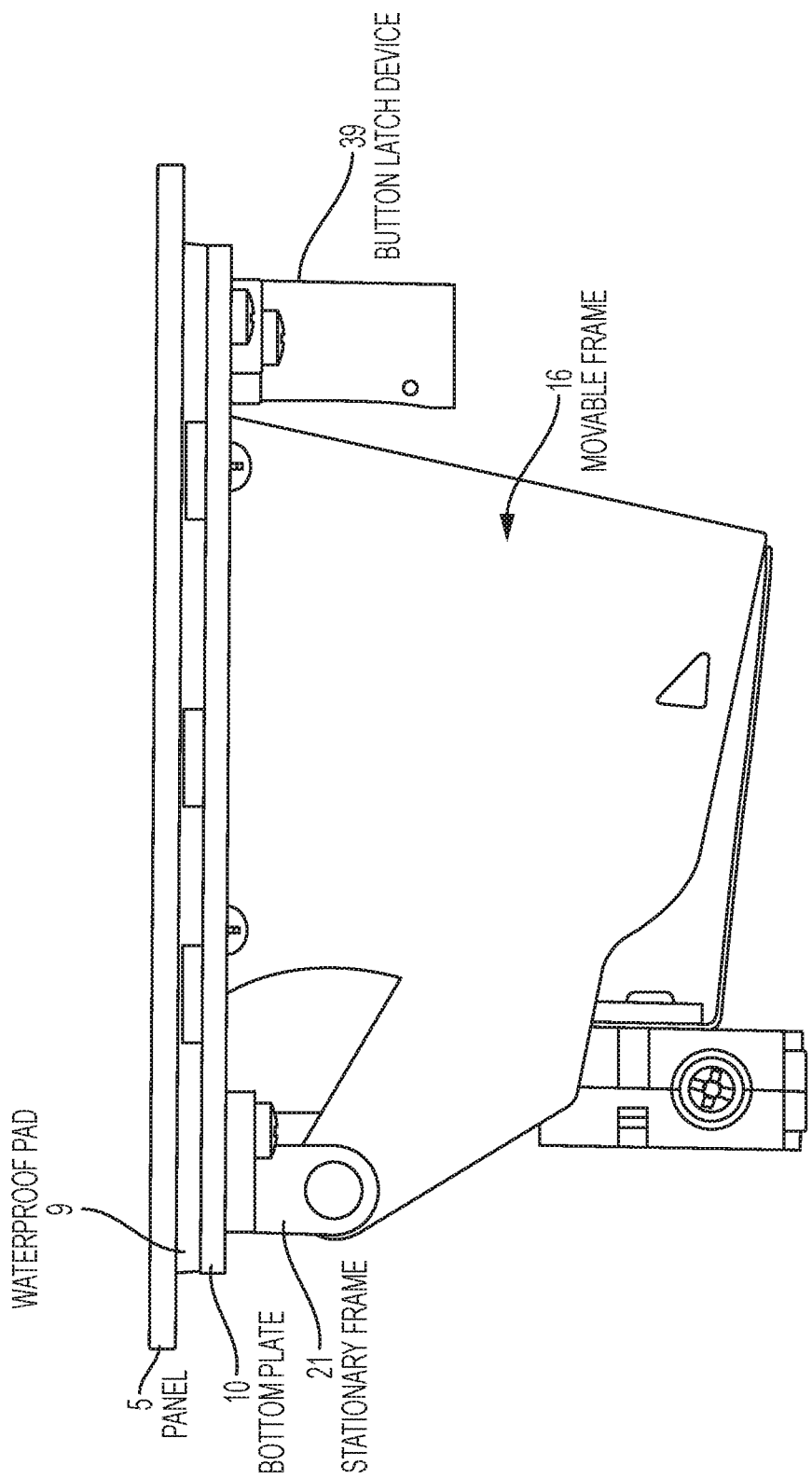
FIG. 5 is a right side view of the implementation of the presently disclosed embodiments.

The reference numbers in the Figures identify the following elements: 1. Upper cover, 2. Button, 3. O-ring, 4. Cir-clip, 5. Plate, 6. Latch, 7. Swing arm, 8. Spring, 9. Waterproof pad, 10. Bottom plate, 11. Spindle, 12. Latch box, 13. Latch box fastener, 14. Bottom plate fastener, 15. Movable frame fastener, 16. Movable frame, 17. Terminal element, 18. Stationary frame fastener, 19. Spindle, 20. Torsional spring, 21. Stationary frame, 22. Cylinder, 23. Rectangular press surface, 24. Upper O ring slot, 25. Lower O ring slot, 26. Cir-clip slot, 27. Spherical surface, 28. Swing arm aperture, 29. Cylinder aperture, 30. Through hole, 31. Projection part of the swing arm, 32. Base section, 33. Groove, 34. Swing arm upper portion, 35. Damper, 36. Mounting hole, 37. Spindle hole, 38. Spring base, 39. Button latch device, 40. an Upper cuboid part, 41. Button assembly shaft, 42 Latch box front, 43. Latch box back, 44. Latch box wall, 45. Latch box side walls, 46. Latch box bottom wall, 47. Plate frame, 48. Function part, Sheet 101, Upper cover 102, Plate frame sheet 103, Plate frame 104, Seal ring 105, Base plate 106, Outside frame 107, Plate frame fastener 108, Press cover latch 109, Movable frame 111, Function part 113, Damping device 116, Plate 124.

DETAILED DESCRIPTION

Combining with the implementation and attached drawings, it is hereby to describe the invention further.

Referring to FIGS. 1-14, the waterproof and dust proof secure pop-up floor box 100 comprises a plate 5, waterproof pad 9, upper cover 1, push button latch device 39, movable frame 16, stationary frame 21, torsional spring 20, and spindle 19. The movable frame 16 houses a function part 48 or parts that may be exposed for use when the movable frame 16 is extended or popped up. The function part 48 may include receptacles for accepting different connections, for example, power plugs, network plugs, coaxial connectors, or any other suitable connectors. The pop up box 100 also includes a bottom plate 10 and a waterproof pad 9. The waterproof and dust proof secure pop-up floor box 100 has the following characteristics: the waterproof pad 9 is pressed on to the plate 5. The bottom plate 10 is mounted below the waterproof pad 9. The plate 5, waterproof pad 9, and bottom plate 10 together comprise a plate frame 47. The push button latch device 39 includes a latch box 12, a button 2, a latch 6, a swing arm 7, two springs 8, and a spindle 11. The button 2 includes a shaft 41 on which two O-rings 3 are mounted, and the shaft 41 is plugged in a cylinder 22 of the plate 5. The button 2 is fastened with a cir-clip 4. The latch 6 is positioned in a groove 33 of the bottom plate 10. Upper portions 34 of the swing arm 7 are inserted into apertures 28 in the latch 6. One end of each of the two springs 8 is received by a base section 32. The swing arm 7 and the other end contacts a bottom surface of the latch box 12. The swing arm 7 is pinned inside the latch box 12 by spindle 11. The latch box 12 is fixed below the bottom plate 10. A lower spherical surface 27 of the button shaft 41 contacts a projection part 31 of a bottom portion of the swing arm 7 so that a vertical motion of the shaft applies a force to the projection part 31 of the swing arm 7, causing the swing arm to rotate around spindle 11 and the latch 6 to move laterally within the groove 33. When the latch 6 retracts, the movable frame assembly is released and pops up. When the shafts returns to its original position after the movable frame assembly has popped up, the latch will extend out to block a bottom portion of the movable frame assembly in order to prevent the pop up box from closing.

Figure 6:
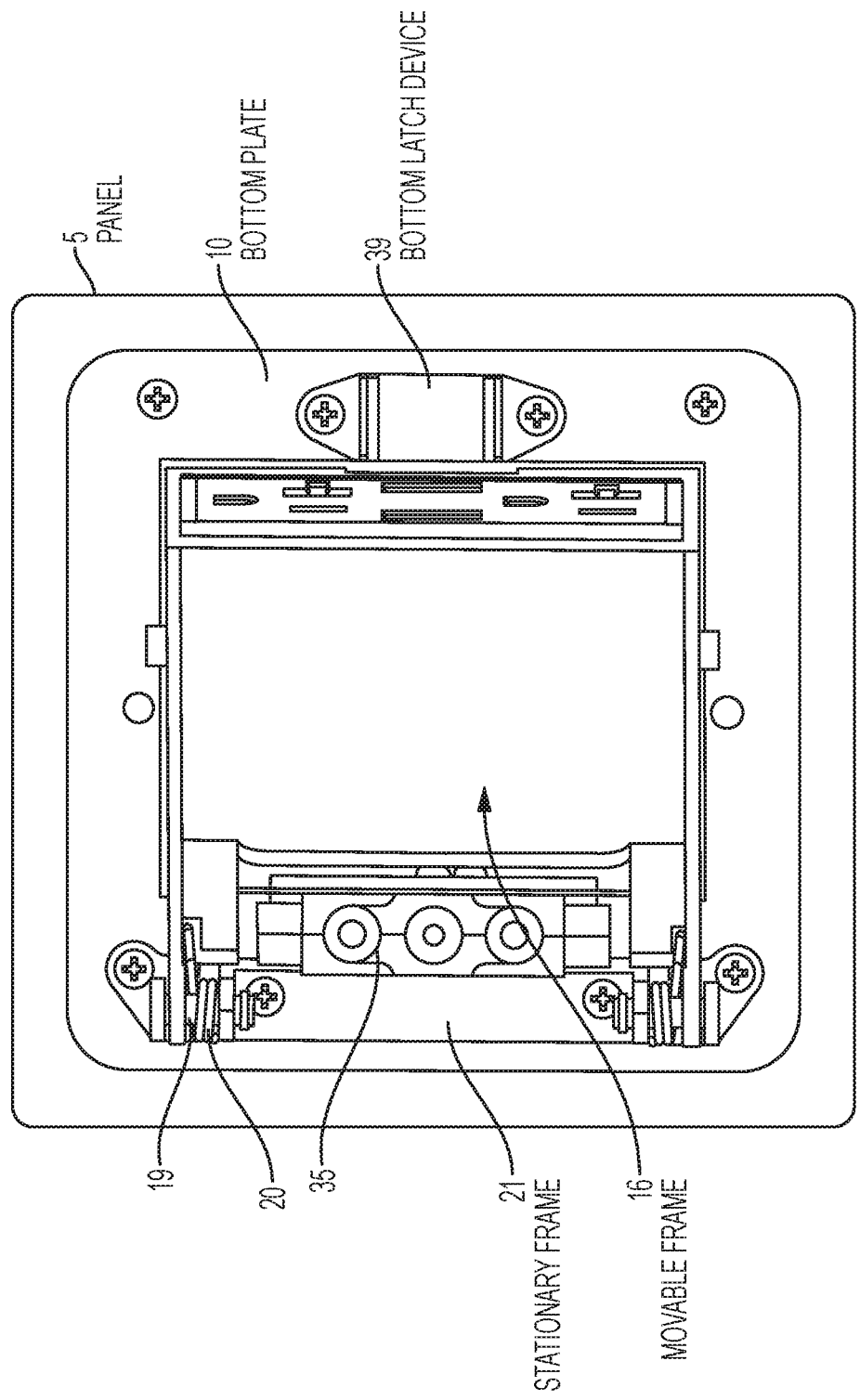
FIG. 6 is a rear view of the implementation of the presently disclosed embodiments.
Figure 7:
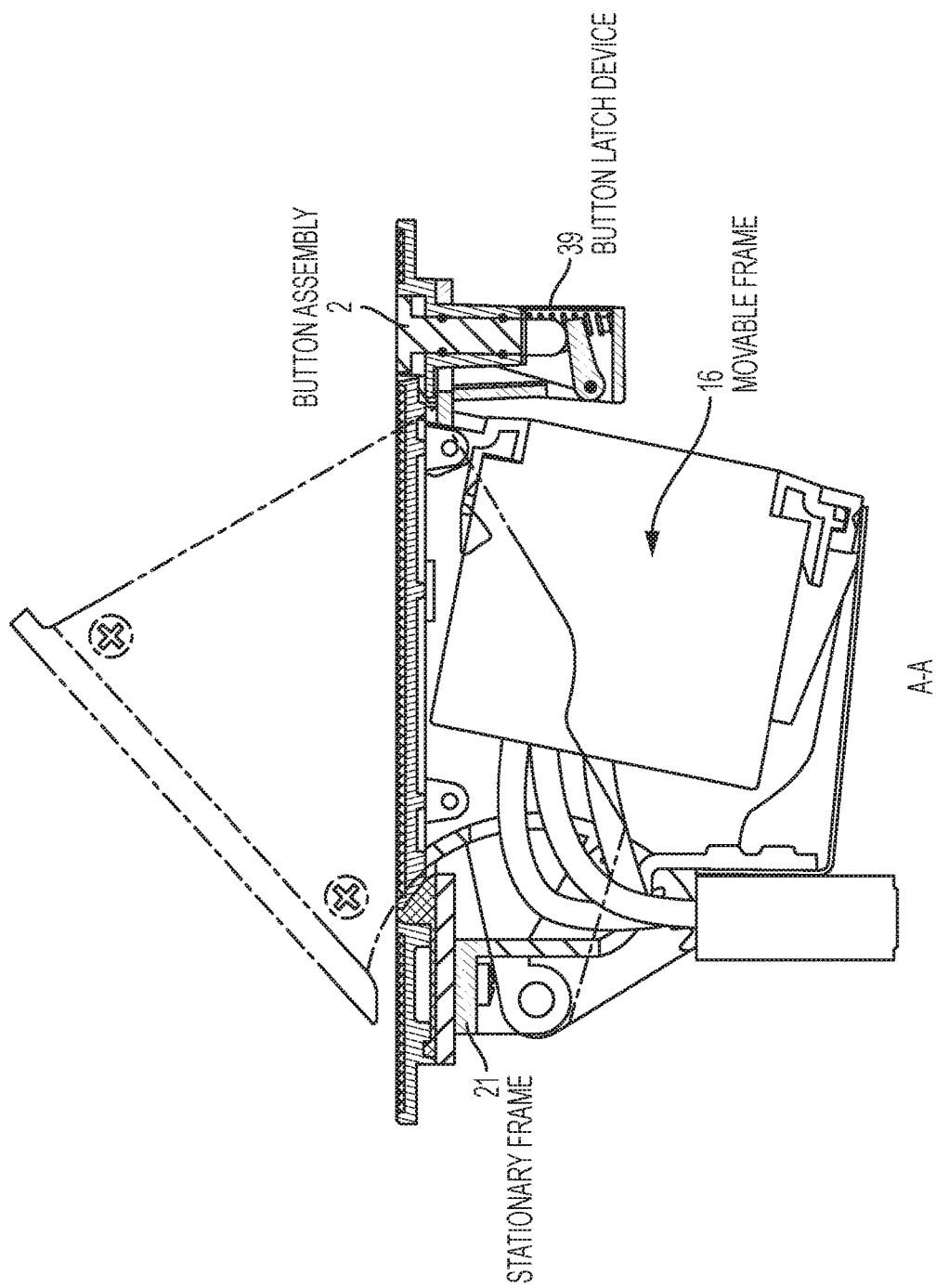
FIG. 7 is the A-A cross-sectional view of FIG. 3.
Figure 8:
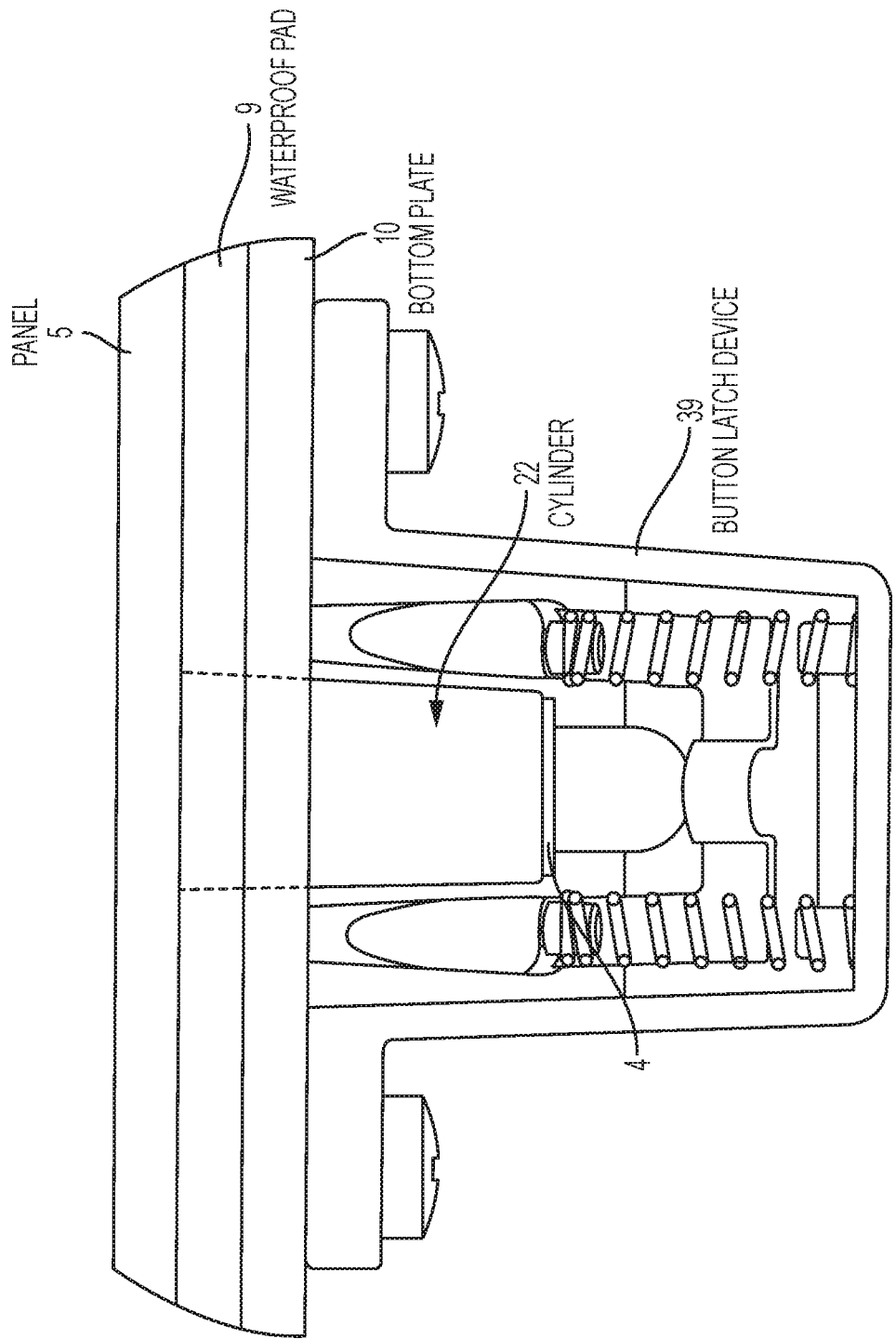
FIG. 8 is a schematic front view of a push button latch device according to the presently disclosed embodiments.
Figure 9:
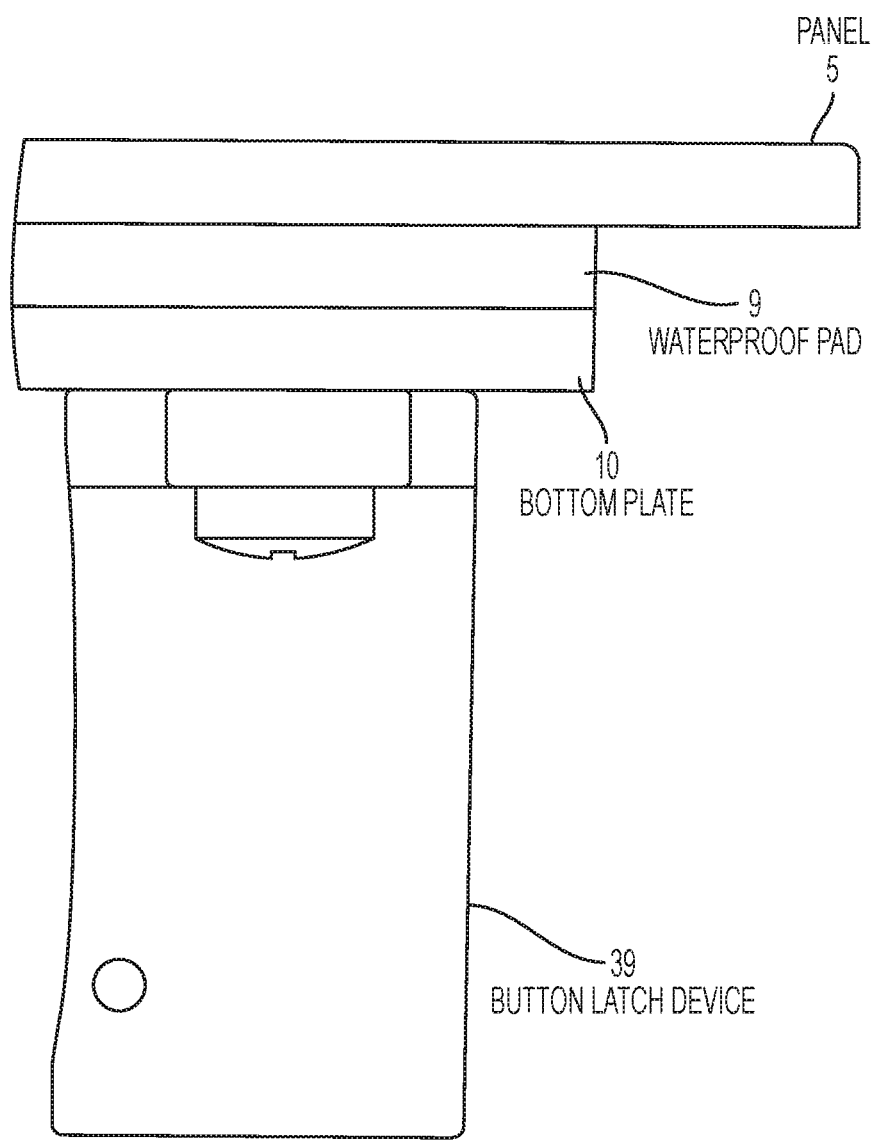
FIG. 9 is a schematic side view of the push button latch device.
Figure 10:
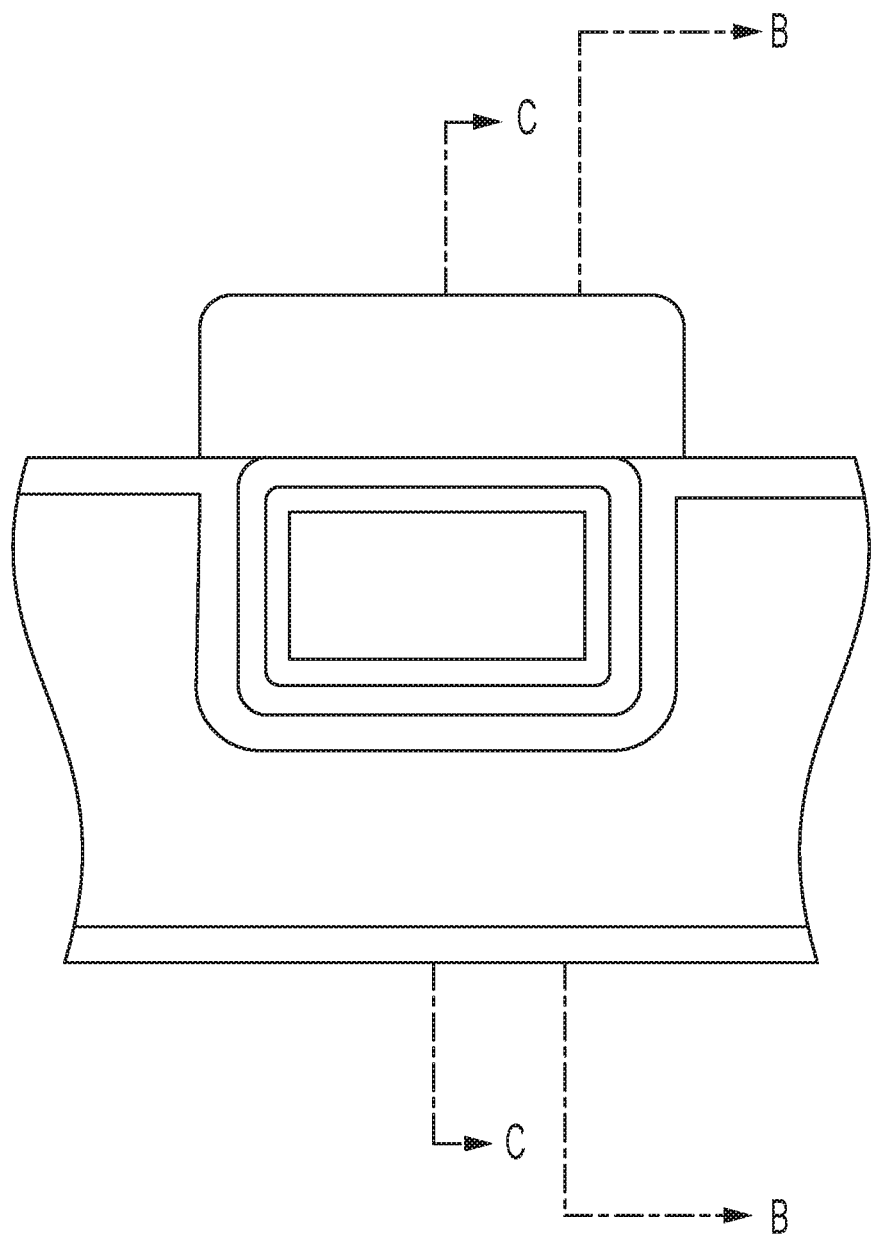
FIG. 10 is a schematic plan view of the push button latch device.
Figure 11:
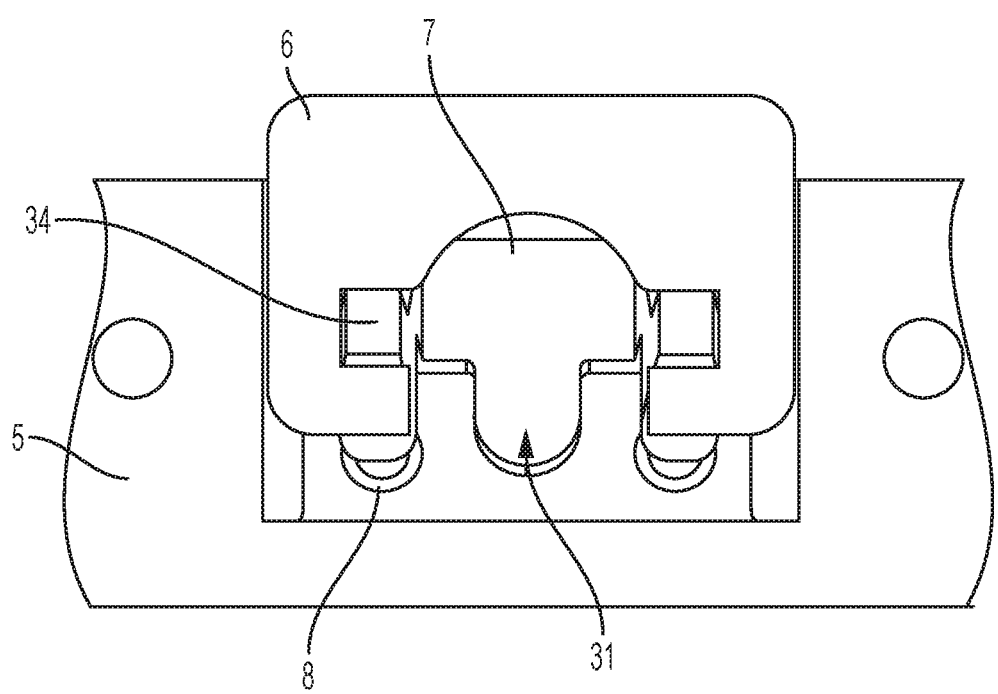
FIG. 11 is the schematic plan view of the push button latch device partially dismantled without a button assembly.
Figure 12:
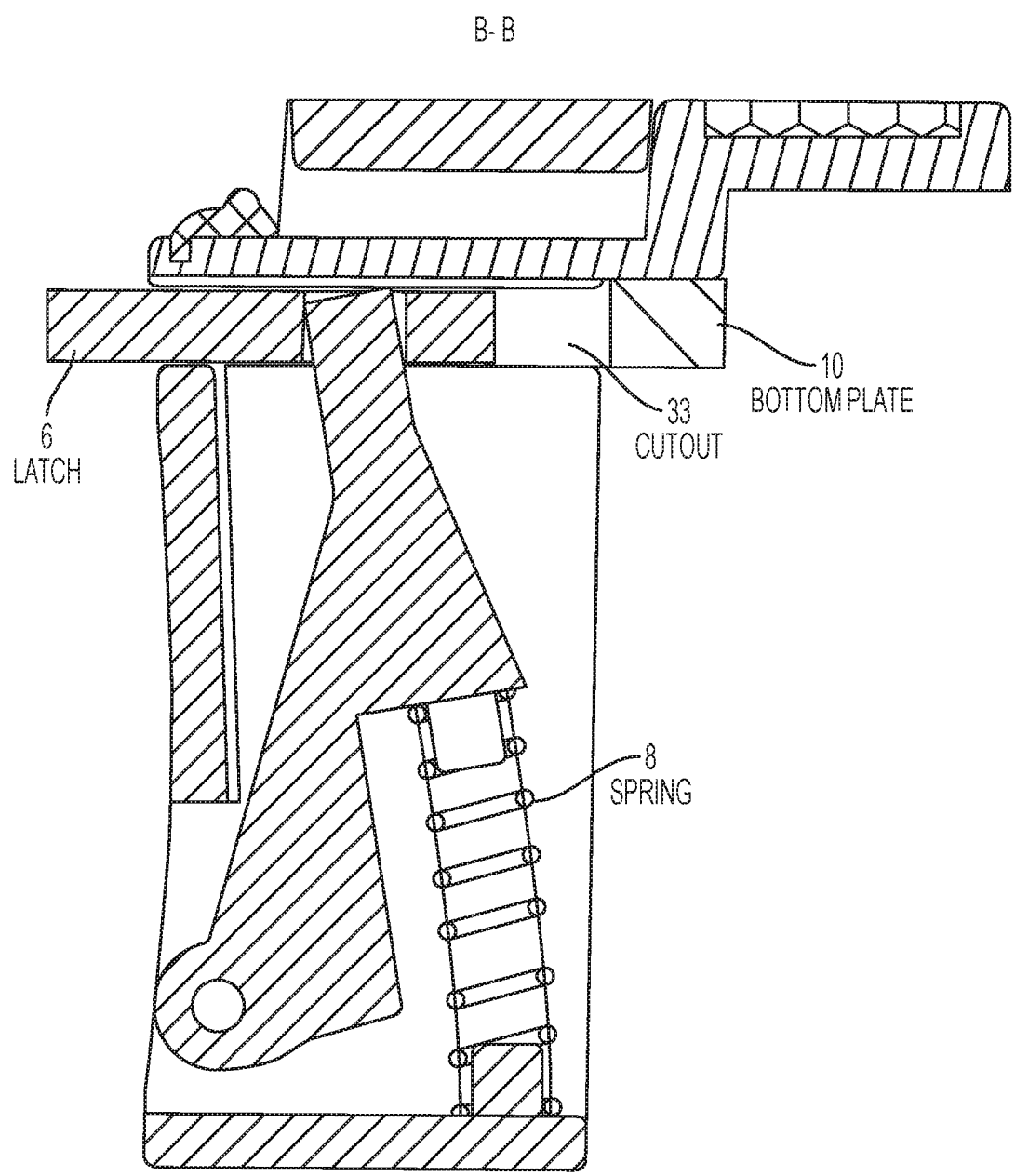
FIG. 12 is the B-B sectional view of FIG. 10.
Figure 13:
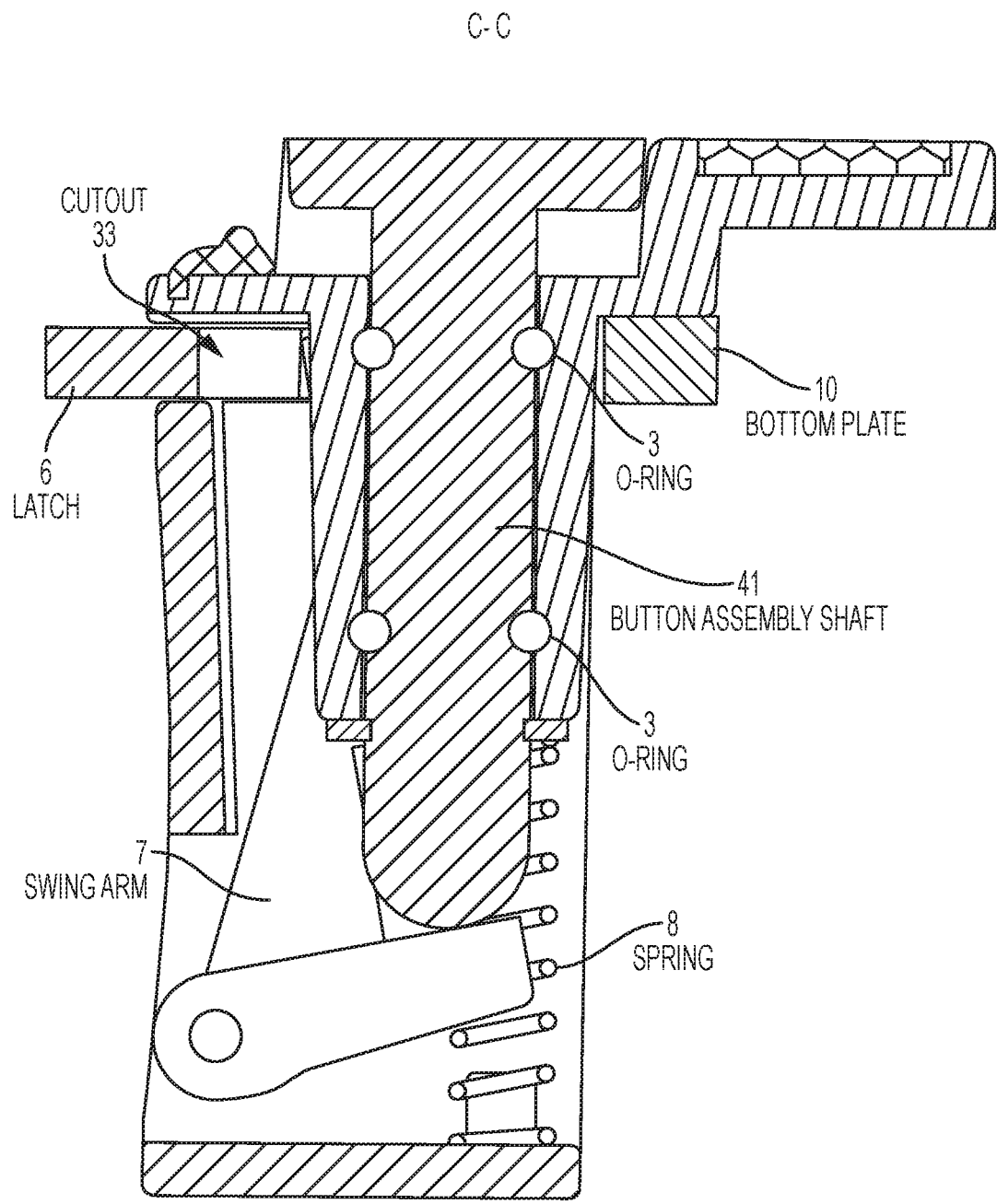
FIG. 13 is the C-C sectional view of FIG. 10.
Figure 14:
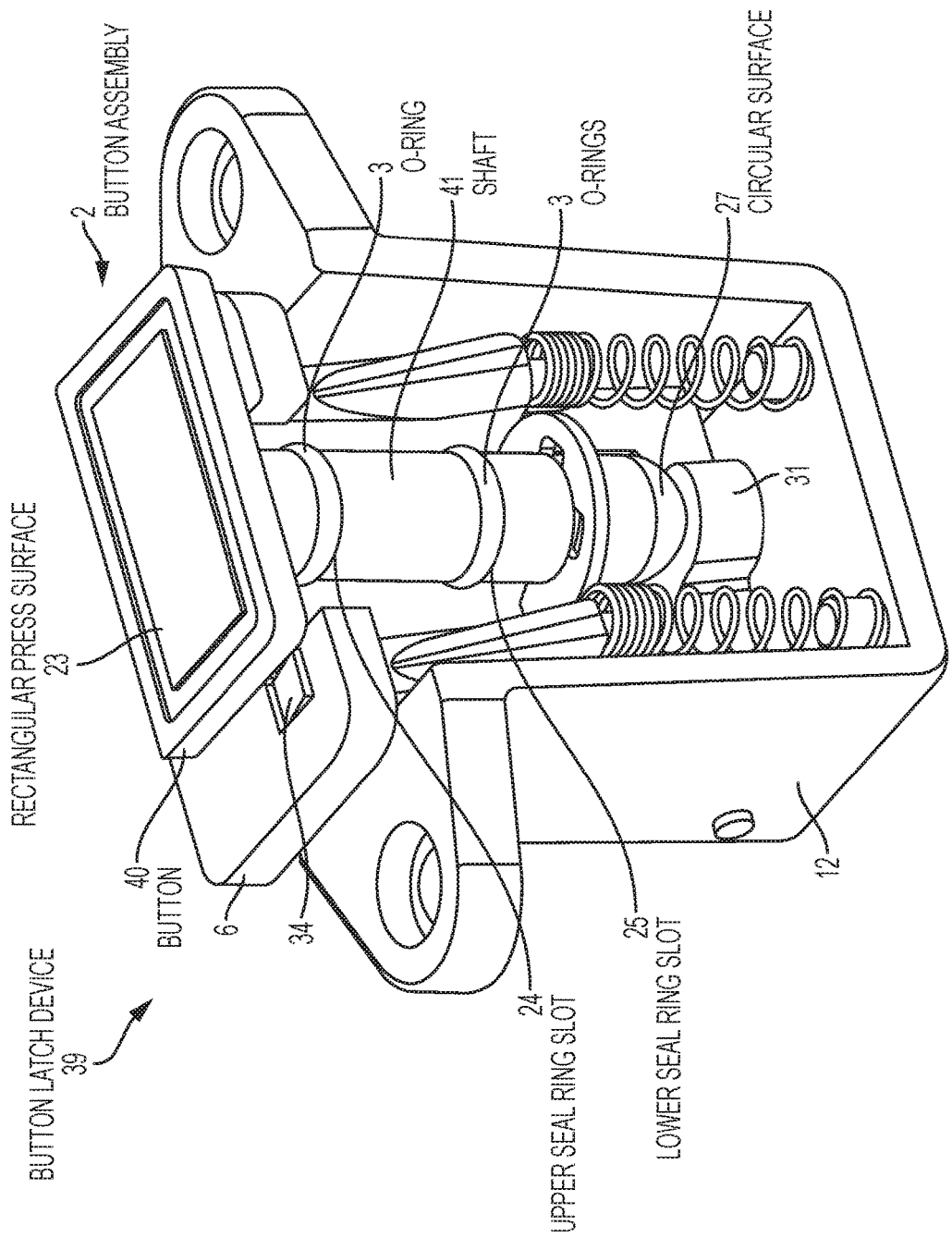
FIG. 14 is a perspective view of the push button latch device.
Figure 31:
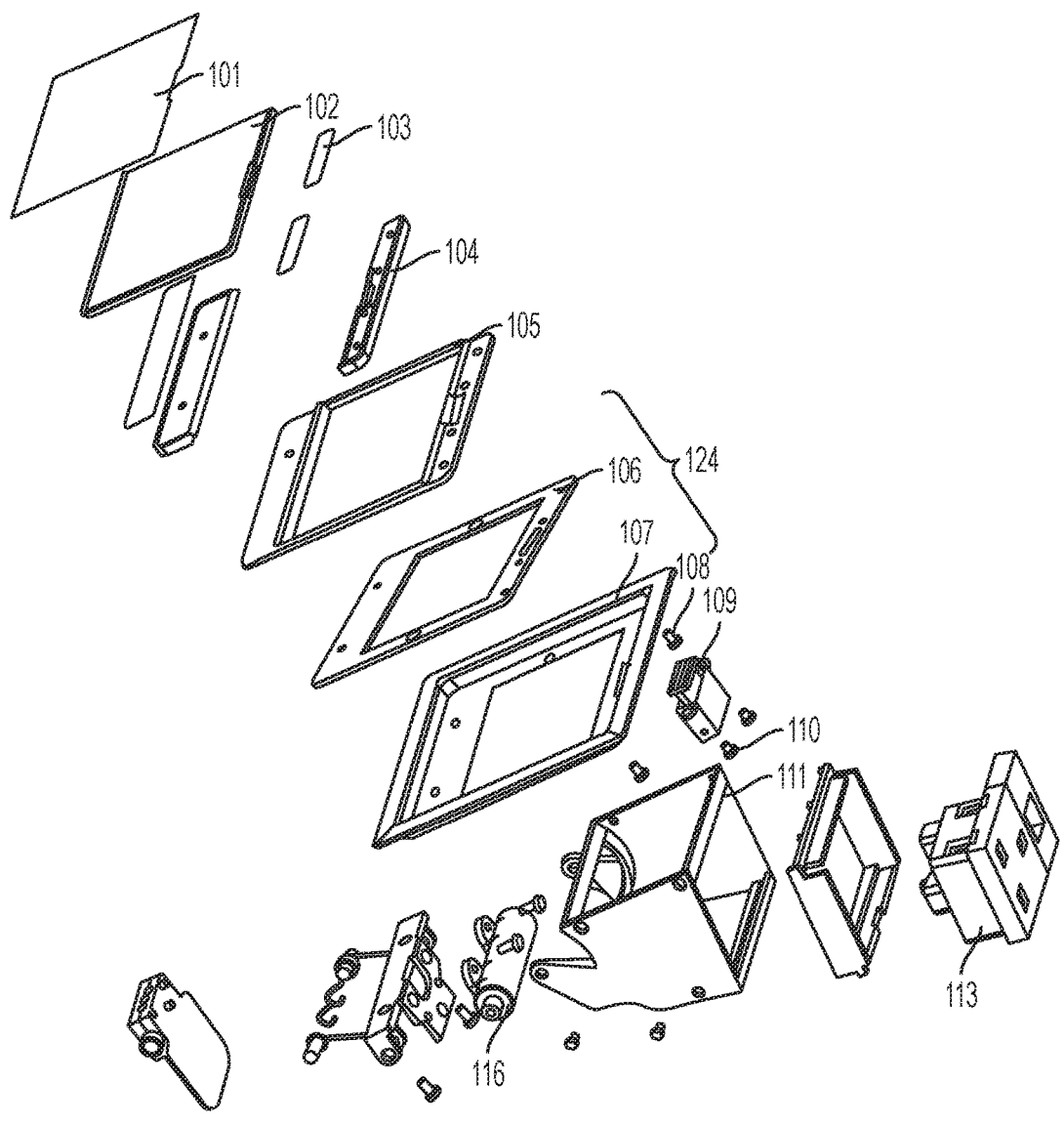
FIG. 31 is an exploded view of a prior art pop up box.

Referring to FIG. 8, the cylinder 22 is integrated with the plate 5. Referring to FIGS. 1 and 6, the waterproof pad 9 is made of rubber and includes some certain structures on both upper and back sides. The plate 5 also has some certain structures on back sides. The structures of a upper side of the waterproof pad 9 facing the back side of plate 5 coordinate with the structures of the plate 5. For example, the structures of the waterproof pad 9 and the plate 5 have mating patterns and interleave with each other. Correspondingly, the bottom plate 10 may also have some certain structures on the upper sides. The structures of a back side of the waterproof pad 9 facing the bottom plate 10 also coordinate with the structures of the bottom plate 10. For example, the structures of the waterproof pad 9 and the bottom plate 10 have mating patterns and interleave with each other. The bottom plate 10, waterproof pad 9, and plate 5 are connected tightly by two fasteners 14 that extend through the bottom plate 10. The combination of the mating or interleaving structures and the tight connection operates to provide a waterproof and dust proof seal for the waterproof and dust proof secure pop-up floor box 100. The latch box 12 is fixed under the bottom plate 10 by two fasteners 13 that extend through the latch box 12. The stationary frame 21 is fixed to the bottom plate 10 by four fasteners 18. The fasteners 14 extending through the bottom plate 10 and fasteners 18 operate to tightly connect the bottom plate 10, waterproof pad 9, and plate 5.

Referring to FIGS. 1, 14, 29, and 30, the button 2 includes an upper cuboid part 40 with a rectangular surface 23. The shaft 41 is round and may extend from a center of the cuboid part 40. There is an upper O ring slot 24, a lower O ring slot 25 and a circlip slot 26 on the shaft 41. An end of the shaft 41 opposite the cuboid part 40 has a spherical surface 27. O-rings 3 are mounted in the upper O ring slot (24) and the lower O ring slot (25) separately to compose the waterproof and dust-proof construction when mounted in the cylinder 22 of plate 5. The spherical surface 27 contacts the projection part 31 of the bottom portion of the swing arm 7 so that a vertical motion of the shaft 41 applies a force to the projection part 31 of the swing arm 7.

Referring to FIGS. 1, 15, 16, 29, and 30, two swing arm apertures 28 and a cylinder aperture 29 are provided in the latch 6. The swing arm apertures 28 are at both sides of the cylinder 29. Upper portions 34 of the swing arm 7 are positioned in the swing arm apertures 28. When the latch 6 is in planar motion with upper portions 34 of the swing arm 7, the cylinder aperture 29 allows the latch 6 to move freely in the groove of the bottom plate 10.

Referring to FIGS. 1, 20, 22, and 30, the swing arm 7 has a rocker structure, that is, the swing arm 7 pivots back and forth around the spindle 11. A lower portion of the swing arm 7 has a through hole 30 for receiving the spindle 11. The projection part 31 of the bottom portion of the swing arm 7 contacts the spherical surface 27 of the button shaft 41. The symmetrical parts at both sides of swing arm (7) are referred to as transition parts, each comprising the base section 32 and the upper swing arm portion 34.

Referring to FIGS. 1, 23, 29, and 30, a front part 42 of the latch box 12 is open and a back part 43 of the latch box 12 is partially open. A box wall 44 extends to form side walls 45 and the back part 43 of the latch box. The side walls 45 extend upward and then outward at approximately 90 degrees to form mounting tabs with holes 36. The side walls 45 also have a spindle hole 37. A bottom wall 46 of the latch box 12 also includes two spring bases 38 for receiving the ends of the springs 8.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments. Moreover, it should be recognized that structures or elements shown or described in connection with any disclosed form or embodiment may be incorporated in any other disclosed or described or suggested form or embodiment. Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A pop up box comprising:
   an upper cover;
   a stationary frame pivotally fastened to a movable frame;
   a plate gasket forming a waterproof and dustproof seal, the plate gasket interposed between the upper cover and the stationary frame and having an opening through which the movable frame extends when released, wherein the plate gasket comprises a panel, a bottom plate, and waterproof pad interposed between the panel and the bottom plate, and wherein the panel, waterproof pad, and bottom plate have mailing and interleaving patterns to effect the waterproof and dustproof seal; and
   a button latching device having a waterproof and dustproof seal formed by at least one O-ring seal.

2. The pop up box of claim 1, wherein the movable frame houses a function part having connector receptacles.

3. The pop up box of claim 1, wherein the stationary frame is fastened to the bottom plate.

4. The pop up box of claim 1, comprising a latch slidingly installed in a cutout of the bottom plate.

5. The pop up box of claim 4, wherein the button latching device comprises:
   a latch box fastened to the bottom plate;
   a rotatably mounted, spring loaded swing arm mounted within the latch box with upper portions positioned within apertures of the latch;
   a button assembly including a shaft extending through a cylinder of the bottom plate and configured to contact a projection part of the swing arm, the button assembly comprising the at least one O-ring seal mounted between the shaft and the cylinder to form the waterproof and dustproof seal.

6. The pop up box of claim 5, wherein the latch, shaft and swing arm are positioned such that downward movement of the shaft applies force to a projection part of the swing arm causing the swing arm to rotate and the latch to retract, releasing and allowing the movable frame assembly to pop up.

7. The pop up box of claim 6, wherein the latch, shaft and swing arm are positioned such that upward movement of the shaft after the movable frame assembly has popped up causes the swing arm to rotate and the latch to extend, blocking the moveable frame from closing.

8. A pop up box comprising:
   an upper cover;
   a stationary frame pivotally fastened to a movable frame;
   a plate gasket forming a waterproof and dustproof seal, the plate gasket interposed between the upper cover and the stationary frame and having an opening through which the movable frame extends when released, wherein the plate gasket comprises a panel, a bottom plate, and waterproof pad interposed between the panel and the bottom plate;

a latch slidingly installed in a cutout of the bottom plate and a button latching device having a waterproof and dustproof seal formed by at least one O-ring seal, the button latching device comprising:

a latch box fastened to the bottom plate;

a rotatably mounted, spring loaded swing arm mounted within the latch box with upper portions positioned within apertures of the latch; and a button assembly including a shaft extending through a cylinder of the bottom plate and configured to contact a projection part of the swing arm, the button assembly comprising the at least one O-ring seal mounted between the shaft and the cylinder to form the waterproof and dustproof seal.

9. The pop up box of claim 8, wherein the panel, waterproof pad, and bottom plate have mating and interleaving patterns to effect the waterproof and dustproof seal.

10. The pop up box of claim 8, wherein the latch, shaft and swing arm are positioned such that downward movement of the shaft applies force to a projection part of the swing arm causing the swing arm to rotate and the latch to retract, releasing and allowing the movable frame assembly to pop up.

11. The pop up box of claim 10, wherein the latch, shaft and swing arm are positioned such that upward movement of the shaft after the movable frame assembly has popped up causes the swing arm to rotate and the latch to extend, blocking the moveable frame from closing.

* * * * *